(12) United States Patent
Wang et al.

(10) Patent No.: US 8,719,357 B2
(45) Date of Patent: May 6, 2014

(54) METHOD AND APPARATUS FOR MANAGING MESSAGE

(75) Inventors: Chunpeng Wang, Shenzhen (CN); Ying Li, Shenzhen (CN); Ke Liu, Shenzhen (CN); Bin Li, Shenzhen (CN); Qinan Xiong, Shenzhen (CN); Huan Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/613,590

(22) Filed: Sep. 13, 2012

(65) Prior Publication Data

US 2013/0031178 A1   Jan. 31, 2013

Related U.S. Application Data

(63) Continuation of application No. PCT/CN2011/077633, filed on Jul. 26, 2011.

(30) Foreign Application Priority Data

Sep. 6, 2010   (CN) .......................... 2010 1 0276192

(51) Int. Cl.
*G06F 15/16* (2006.01)

(52) U.S. Cl.
USPC .......................................... 709/206; 709/207

(58) Field of Classification Search
USPC .................................................. 709/206, 207
See application file for complete search history.

(56) References Cited

U.S. PATENT DOCUMENTS

| | | | |
|---|---|---|---|
| 7,599,906 B2 * | 10/2009 | Kashiwagi et al. ................... | 1/1 |
| 7,620,765 B1 | 11/2009 | Ohr et al. | |
| 2004/0054737 A1 * | 3/2004 | Daniell .......................... | 709/206 |
| 2004/0078439 A1 * | 4/2004 | Staack ........................... | 709/206 |
| 2004/0148356 A1 * | 7/2004 | Bishop et al. ................... | 709/206 |
| 2005/0234850 A1 * | 10/2005 | Buchheit et al. ................... | 707/1 |
| 2011/0191433 A1 * | 8/2011 | Du ................................. | 709/206 |
| 2012/0198233 A1 * | 8/2012 | George et al. ................... | 713/168 |

FOREIGN PATENT DOCUMENTS

| CN | 1890644 A | 1/2007 | |
|---|---|---|---|
| CN | 200910206825 | * 10/2009 | ............. H04L 12/58 |
| JP | 2008198053 A | 8/2008 | |

OTHER PUBLICATIONS

Berni Dwan, Avoiding Email Blunders Even After the Email is Sent, Computer Fraud & Security, vol. 2002, Issue 4, Apr. 1, 2002, pp. 7-9.*

Written Opinion, International application No. PCT/CN2011/077633, Nov. 3, 2011 (English translation).

International Preliminary Report on Patentability, International application No. PCT/CN2011/077633, Mar. 12, 2013 (English translation).

International Search Report for PCT/CN2011/077633 dated Nov. 3, 2011.

* cited by examiner

*Primary Examiner* — Oscar Louie
*Assistant Examiner* — Taylor Elfervig
(74) *Attorney, Agent, or Firm* — Marshall, Gerstein & Borun LLP

(57) ABSTRACT

The present invention provides a method and an apparatus for managing message, including: receiving a request to perform a predetermined operation by a first user on a first message, the first message published by a second user and was previously obtained by the first user before the request to perform the predetermined operation, the request comprising information associated with the predetermined operation on the first message; determining status information of the first message based on a first index of the first message; sending the first message to the first user based on the status information.

4 Claims, 4 Drawing Sheets

METHOD AND APPARATUS FOR MANAGING MESSAGE

CROSS-REFERENCE TO RELATED APPLICATIONS

This is a continuation of International Patent Application No. PCT/CN2011/077633 filed Jul. 26, 2011, which claims the priority benefit of Chinese Patent Application No. CN 201010276192.0 filed Sep. 6, 2010, the entire respective disclosures of which are incorporated herein by reference.

FIELD OF THE INVENTION

The present invention relates to instant messaging technologies, and more particularly to a method and apparatus for managing message.

BACKGROUND ART

Network instant messaging tools develop up to now, have been accepted by the majority of internet users, and become essential software tools in people work and lives. People use the instant messaging tools to publish all kinds of information in work and lives on the internet, the server stores all kinds of information published by the user. Thus, how to effectively manage all kinds of information published by users becomes a problem which users are very concerned about.

In the existing method for managing message, when the server receives a request for deleting one message published by one user, the serve finds out the message according to an index of the message carried in the request and absolutely deletes the message, in this way, other users cannot perform operations such as extracting or forwarding the message or opening conversation on the message. However, in some specific applications, it may be needed to display the deleted message, but since the message has been absolutely deleted, thus, the above need cannot be met, and the scalability is low.

SUMMARY

One embodiment of the present invention provides a method and an apparatus for managing message. The technical solution is as follows:

A method for managing message in a computer network, the method comprises:

receiving a request to perform a predetermined operation by a first user on a first message, the first message published by a second user and has been previously obtained by the first user before the request to perform the predetermined operation, the request comprising information associated with the predetermined operation on the first message;

determining, based on a first index corresponding to the first message, status information of the first message;

if the status information indicates that the first message is in a normal status, generating a second index and a second message, the second message corresponding to the second index and comprising the first index, the information associated with the predetermined operation, and the second index, sending, to the first user, the first message and the information associated with the predetermined operation; and if the status information indicates that the first message is in a deleted status, prompting the first user about failure of the predetermined operation.

An apparatus for managing message comprises:
a processor;
a memory coupled to the processor, the memory storing instructions executable by the processor, the instructions comprising:

receiving, a request to perform a predetermined operation by a first user on a first message, the first message is published by a second user and has been previously obtained by the first user before the request to perform a predetermined operation, the request comprising information associated with the predetermined operation on the first message;

determining, based on a first index that corresponds to the first message, status information of the first message;

if the status information indicates that the first message is in a normal status, generating a second index and a second message, the second message corresponding to the second index and comprising the first message, the information associated with the predetermined operation on the first message, and the second index, sending to the first user, the first message and the information associated with the predetermined operation on the first message; and if the status information indicates that the first message is in a deleted status, prompting the first user about failure of the predetermined operation.

A non-transitory computer readable medium comprises computer-readable instructions executable by a processor to:

receive a request to perform a predetermined operation by a first user on a first message, the first message published by a second user and has been previously obtained by the first user before the request to perform the predetermined operation, the request comprising information associated with the predetermined operation on the first message;

determine, based on a first index corresponding to the first message, status information of the first message;

if the status information indicates that the first message is in a normal status, generate a second index and a second message, the second message corresponding to the second index and comprising the first index, the information associated with the predetermined operation, and the second index, send, to the first user, the first message and the information associated with the predetermined operation; and if the status information indicates that the first message is in a deleted status, prompt the first user about failure of the predetermined operation, wherein the predetermined operation on the first message comprises one of: forwarding the first message and starting conversation from the first message; wherein the information associated with the predetermined operation is comment message by the first user when the predetermined operation is forwarding the first message, and the information associated with the predetermined operation is conversation message by the first user when the predetermined operation is starting conversation from the first message.

The advantages brought by the technical solution provided by embodiments of the present invention include:

Through setting the message state, the effect that the message is deleted can be achieved for clients so that other users cannot extract, forward or communicate (start conversation) with the message in deleted state; but the message still exists, the deleted message can be displayed in follow-up specific applications, the present invention has good scalability.

BRIEF DESCRIPTION OF THE DRAWINGS

The exemplary embodiments of the present invention are hereinafter further described in details with reference to drawing, to make those skilled in the art better understand the above and other features and advantages of the present invention, in drawings.

DETAILED DESCRIPTION OF EXAMPLES

To make the objectives, technical solution and advantages of the present invention more clear, the solution of the present invention is hereinafter described in detail with reference to the accompanying drawings and embodiments.

Embodiment 1

Figure 1:
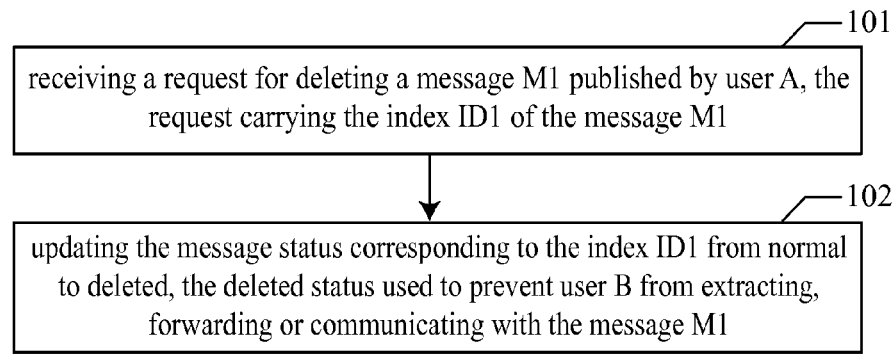
FIG. 1 is a flow chart of a method for managing message provided in an embodiment 1 of the present invention.

FIG. 1 is a flow chart of a method for managing message provided in the embodiment 1 of the present invention. In FIG. 1, the method specifically can use a server to perform the following steps, including:

101: receiving a request for deleting a message M1 published by user A, the request carrying an index ID1 of the message M1.

102: updating message state corresponding to the index ID1 from normal state to deleted state, the deleted state is used to prevent user B from extracting, forwarding or communicating (starting conversation) with the message M1.

The user B can be an audience of the user A; since audiences can automatically and frequently extract messages of the user A, they have the fastest transmission speed for messages, thus, preventing these audiences from extracting, forwarding or communicating with messages in deleted state can effectively prevent the transmission of messages. The user B can also be other common user, the common user can see messages published by all users including the user A in the broadcasting hall, and the embodiment can also prevent common users from transmitting messages through setting deleted state.

In the method provided in the embodiment, through setting the message state, the effect that the message is deleted can be achieved for clients so that other users cannot extract, forward or communicate with the message in deleted state, but the message still exists, the deleted message can be displayed in follow-up specific applications, the present invention has good scalability.

The method provided in the embodiment can be applied in instant message field; the following will take microblogging as an example to explain the above method in details.

In microblogging, the message type at least includes: broadcasting, forwarding and communicating. A broadcasting message which is an original message published by a user, can be received by all the audiences of the publisher; a forwarding message, which forwards messages published by other users and the user who forwards the messages can also comment on these messages in the forwarding message can be received by all the audience of the publisher; a communicating message is used to send and receive conversation messages between the two sides of communication. The message state at least includes: normal and deletion. According to different entities who execute the deletion of messages, the deletion can be subdivided into user deletion and administer deletion. According to actual business needs, the message state can also have other customized or user-defined states and some of these states can be reversible, that is, one state and another state of one message can be interconvertible under certain conditions. For example, the message state can also include an updating state, when the user updates a message, the state of the message is updating state and other users cannot extract the message in updating state; after the user has completed the updating, the state of the message can be converted into normal state, and other users can extract the message in normal state.

Figure 2:
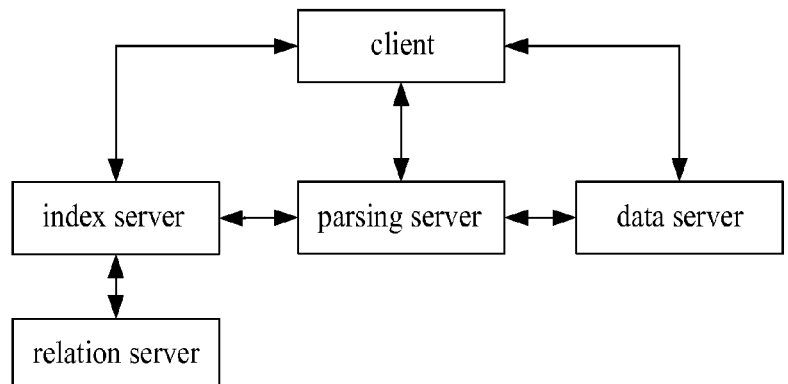
FIG. 2 is a schematic diagram of a network architecture provided in the embodiment 1 of the present invention.

The transmission process of messages in microblogging will be briefly introduced below. FIG. 2 is a schematic diagram of a network architecture provided in the embodiment 1 of the present invention. In FIG. 2, a message sent by a client, which may be any type of client terminal such as a mobile device or a desktop computer, passes through a parsing server, the parsing server parses message contents such as text, relation chain and other contents of the message and allocates a unique index ID for each message. The text of the message and the corresponding ID are stored in a data server, user's account number and the ID of the message are stored in an index server, the relation chain contained in the message is stored in a relation server; the client can obtain the ID of the message from the index server, and obtain the text of the message corresponding to the ID from the data server.

Each server referred in this embodiment can be logical partitioning of an apparatus for managing message, here, the apparatus for managing message corresponds to a server; in order to reduce burden of the apparatus for managing message, the apparatus for managing message can also include various servers, here, the apparatus for managing message corresponds to a service end that includes various servers.

The method for managing message will be explained in light of the five scenarios in the following.

Figure 3:
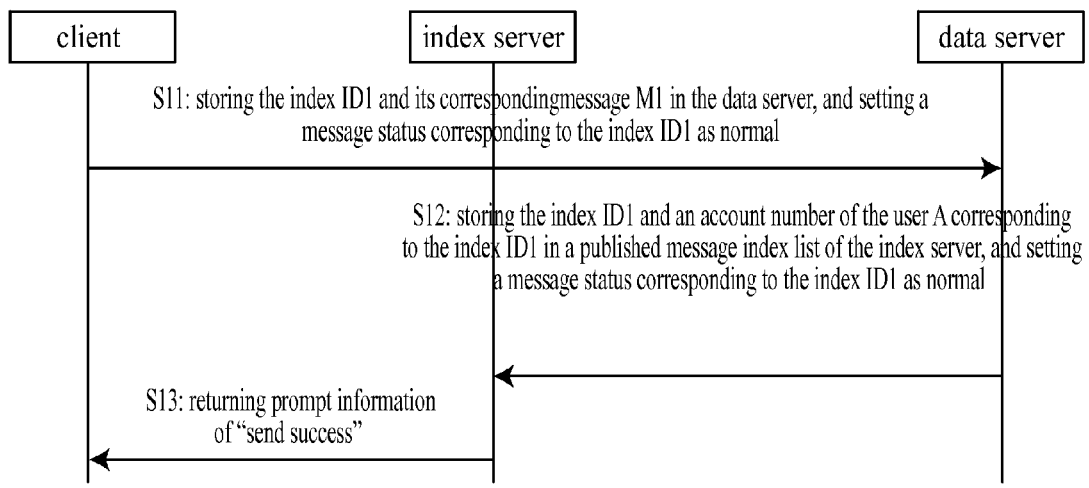
FIG. 3 is an information interaction diagram of publishing message by user A provided in the embodiment 1 of the present invention.

FIG. 3 is an information interaction diagram of publishing message composed by user A provided in the embodiment 1 of the present invention. The process shown in FIG. 3 is performed by a server before the step 101 shown in FIG. 1 and includes:

S10: publishing a message M1 composed by user A, and generating an index ID1 (not labeled in the figure) for the message M1 by the parsing serve.

S11: storing the index ID1 and its corresponding message M1 in the data server, and setting a message state corresponding to the index ID1 as normal.

S12: storing the index ID1 and an account identification such as an account number of user A that corresponds to the index ID1 in a published message index list of the index server, and setting a message state corresponding to the index ID1 as normal.

S13: returning to user A prompt information of "send success".

Figure 4:
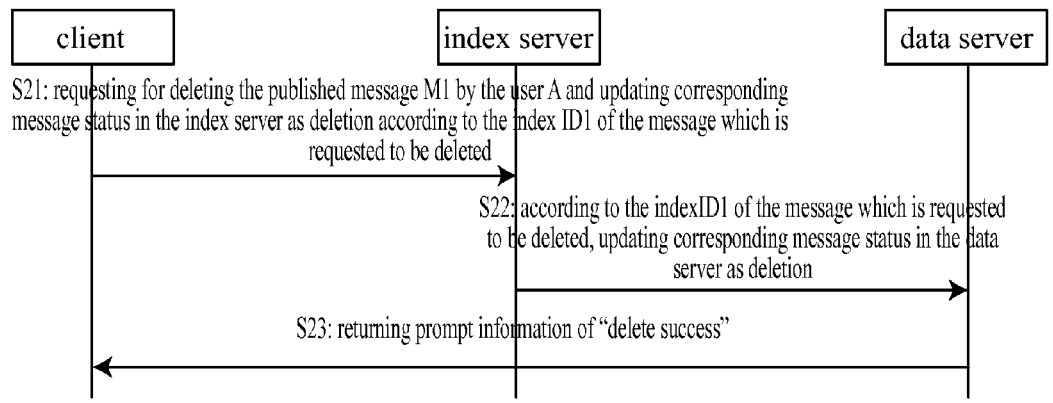
FIG. 4 is an information interaction diagram of deleting message by the user A provided in the embodiment 1 of the present invention.

FIG. 4 is an information interaction diagram of deleting message by the user A provided in the embodiment 1 of the present invention. FIG. 4 shows:

S21: requesting, by the user A, for deleting the published message M1, and updating corresponding message state in the index server as deletion according to the index ID1 of the message which is requested to be deleted.

The "deletion" message state can also be further divided into user deletion and administer deletion, thereby more detailed business divisions and good scalability may be achieved. For example, a user deletes a message published by himself/herself, then the message statue is user deletion; a system administer deletes an undesired message published by a user, then message state is administer deletion.

S22: according to the index ID1 of the message which is requested to be deleted, updating corresponding message state in the data server as deletion.

S23: returning prompt information of "delete success".

With respect to the message in deleted state in this scenario, the server does not really delete the message, and only updates the message state, in this way, the original text can also be displayed when necessary, and a good business supporting ability is provided.

Figure 5:
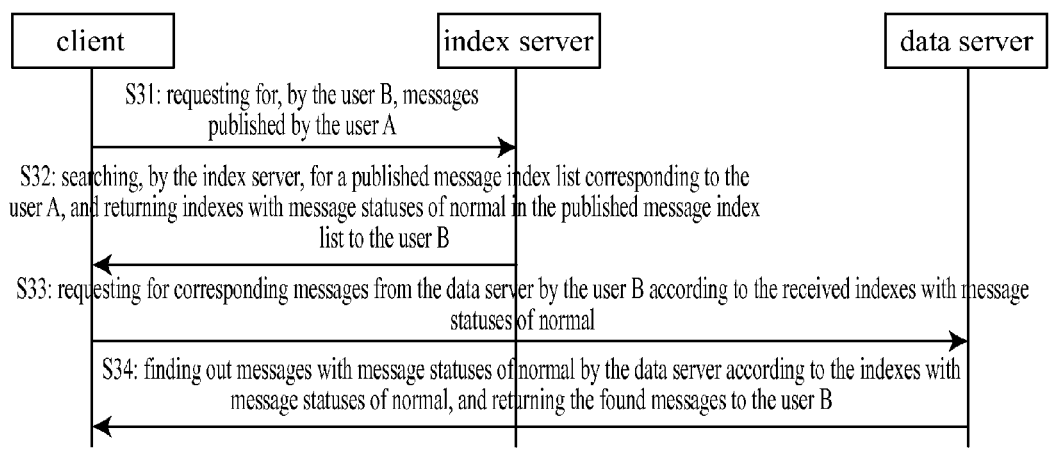
FIG. 5 is an information interaction diagram of extracting message by an audience user B of the user A provided in the embodiment 1 of the present invention.

FIG. 5 is an information interaction diagram of extracting message by an audience user B of the user A provided in the embodiment 1 of the present invention. FIG. 5 shows:

S31: requesting for, by the user B, messages published by the user A.

S32: searching, by the index server, for a published message index list corresponding to the user A, and returning indexes with message states of normal in the published message index list to the user B.

Accordingly, indexes with message states of deletion in the published message index list are not returned to the user B, so that the user B cannot see the messages in deleted state.

S33: requesting for corresponding messages from the data server by the user B according to the received indexes with message states of normal.

S34: searching messages with message states of normal by the data server according to the indexes with message states of normal, and returning the found messages to the user B.

In this scenario, after the user A deletes the message M1, the user B cannot extract the message M1, so that the deleted messages cannot be transmitted.

Figure 6:
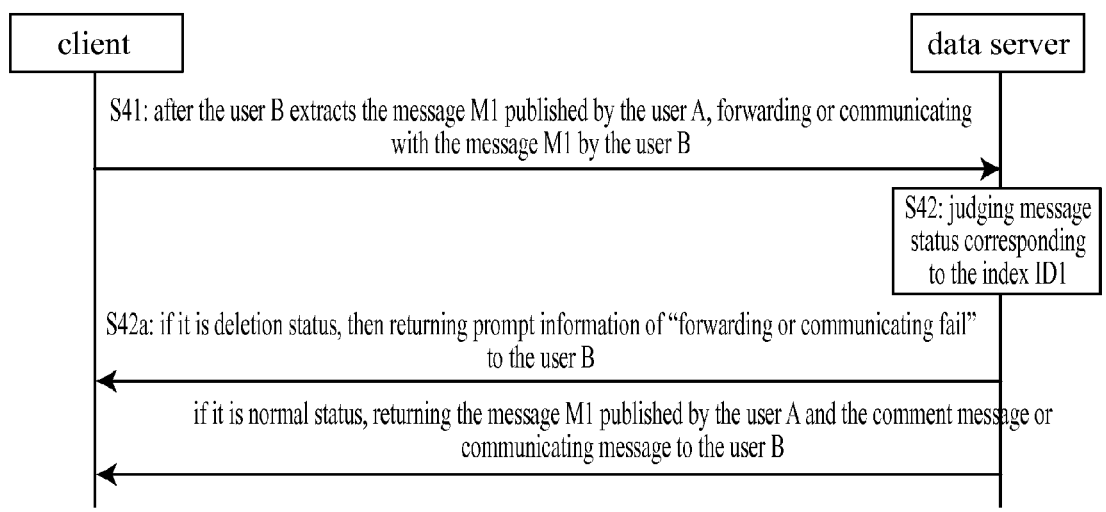
FIG. 6 is an information interaction diagram of forwarding or communicating with message by the audience user B of the user A provided in the embodiment 1 of the present invention.

FIG. 6 is an information interaction diagram of forwarding or communicating (starting conversation) with message by the audience user B of the user A provided in the embodiment 1 of the present invention. FIG. 6 illustrates:

S41: after user B extracts the message M1 published by the user A, forwarding or communicating with the message M1 by the user B.

Before the step 101 in FIG. 1, the user B extracts the message M1 published by the user A, later, the user A deletes the message M1, and then later, the user B forwards or communicates with the message M1.

An index corresponding to the message M1 published by the user A is ID1. Further, the user B can also comment on the message M1 before forwarding.

S42: determining message state corresponding to the index ID1 by the data server.

S42a: if it is deleted state, then returning prompt information of "forwarding or communicating fail" to the user B, the process ends.

Through marking the message that has been deleted by user A as in a delete status, the transmission of the message, which user A wants to stop other people from viewing it, can be reduced as much as possible.

S42b: if it is normal state, then notifying the parsing server to generate an index ID2 of forwarding message or communicating message, storing the index ID2 and an account number of the user B corresponding to the index ID2 in the index server, storing the index ID2 as well as index ID1 and comment message or communicating message corresponding to the index ID2 in the data server, then searching corresponding index ID1 and comment message or communicating message through the index ID2, searching and obtaining the message M1 published by the user A through the index ID1, and returning the message M1 published by the user A and the comment message or communicating message to the user B, then process ends.

Other users can extract original text corresponding to the index ID1 and the comment message or communicating message.

In this scenario, the user B extracts the message M1, and then the user A deletes the message M1 and the user B cannot perform forwarding and communicating operations to the message M1 so that the deleted message cannot be transmitted.

Figure 7:
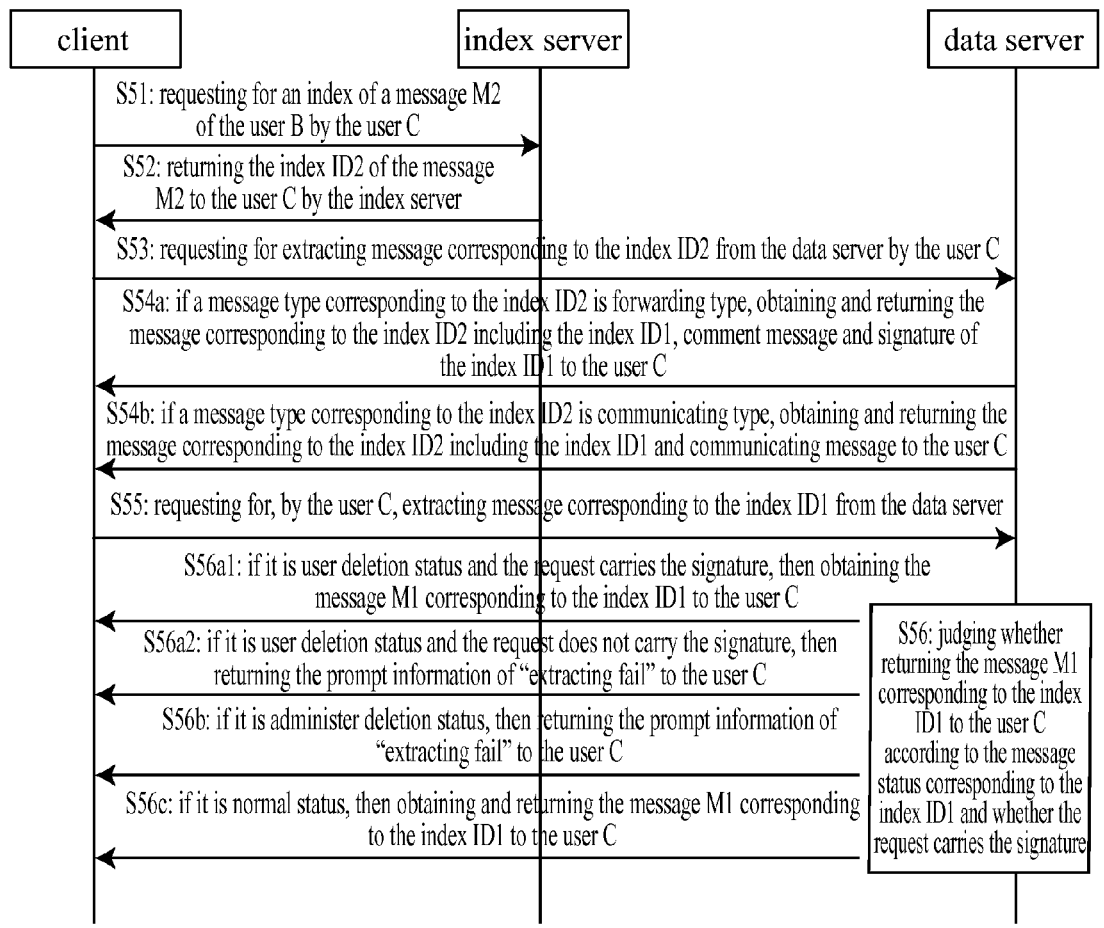
FIG. 7 is an information interaction diagram of extracting, by an audience user C of the user B, forwarded message or communicated message of which original text has been deleted provided in the embodiment 1 of the present invention.

FIG. 7 is an information interaction diagram of extracting, by an audience user C of the user B, a forwarded message or a communicated message of an original message that has been deleted provided in the embodiment 1 of the present invention. In FIG. 7, after "updating message state corresponding to the index ID1 from normal state to deleted state" of the step 102 in FIG. 2, the user C extracting forwarded message or communicated message of which the original message has been deleted, includes:

S51: requesting for an index of message M2 of the user B by the user C.

The message M2 is generated by the user B forwarding or communicating with the message M1 published by the user A. Message M2 may include the following information: index ID2, comment message or conversation message published by user B when user B forwards or communicates with the message M1, message type, message state, and the original message from which message M2 is generated (in this example, the original message is message M1). Message M2 may also include a signature of the original message M1 if message M2 is a forwarding type message. After the user B forwards or communicates with the message M1, the message M1 is deleted. The message M1 can be deleted either by the user A or system administrator, and the message state is "user deletion" or "administrator deletion", respectively. The index of the message M1 is ID1, the index of the message M2 is ID2, that is, the original message M1 and the forwarding or communicating message M2 have their own index, respectively, and are stored in the data server as two messages.

S52: returning the index ID2 of the message M2 to the user C by the index server.

S53: requesting for extracting message, in this example message M2, corresponding to the index ID2 from the data server by the user C.

S54a: if a message type corresponding to the index ID2 is forwarding type, obtaining and returning to user C, by the data server, the message corresponding to the index ID2 that includes the index ID1, comment message and a signature of the index ID1. The signature of the index ID1 is generated together with the message M2 which forwards the original message M1. Embodiments of the invention generate a signature for each forwarding message, but not for communicating messages or publishing messages.

How to obtain signatures belongs to the existing technology.

S54b: if a message type corresponding to the index ID2 is communicating type, obtaining and returning to user C, by the data server, the message corresponding to the index ID2 that includes the index ID1 and communicating message.

S55: receiving, by the user C, the message returned by the data server, and requesting, by the user C, to extract message corresponding to the index ID1 from the data server.

Further, if the message returned by the data server contains the signature of the index ID1, then the request also carries the signature of the index ID1.

S56: determining, by the data server, whether to return the message M1 corresponding to the index ID1 to the user C or not according to the message state of M1 corresponding to the index ID1 and whether the request carries the signature.

S56a: if the message state of M1 is user deleted state, determining whether the request from user C carries the signature, S56a1: if the signature is carried, then obtaining and returning the message M1 corresponding to the index ID1 to the user C, the process ends; S56a2: if the signature is not carried, then returning prompt information of "extracting fail" to the user C, the process ends.

That is, a message, of which the original message has been deleted by a user and which is forwarding type, still can extract the original message; a message, of which the original message has been deleted by user and which is communicating type, cannot extract the original message.

S56b: if the message state of M1 is administrator deleted state, then returning prompt information of "extracting fail" to the user C, the process ends.

That is, for the message deleted by administrator, no matter whether there is signature, the original message will not be returned.

S56c: if it is normal state, then obtaining and returning the message M1 corresponding to the index ID1 to the user C, the process ends.

In this scenario, the message through which user B forwards the message M1 of the user A is recorded as message M2, when the message M1 is deleted by the user A, the user C can extract the message M2 which contains the content of the original message M1, so that the deleted message still can be transmitted; when the message M1 is deleted by administrator, users are not allowed to extract, thereby avoiding the transmission of undesired message. The user C can be an audience of the user B; since audiences of microblogging can automatically and frequently extract messages of the user B, they have the fastest transmission speed for messages, thus, preventing these audiences from extracting, forwarding or communicating with messages that the administrator has deleted state can effectively prevent the transmission of messages, messages in the user deleted state can still be transmitted. The user C can also be other common user, the common user can see messages published by all users including the user B in the broadcasting hall, thus, the common user can be prevented from transmitting the message in the administrator deleted state, and the messages in the user deleted state can still can be transmitted.

Embodiment 2

Figure 8:
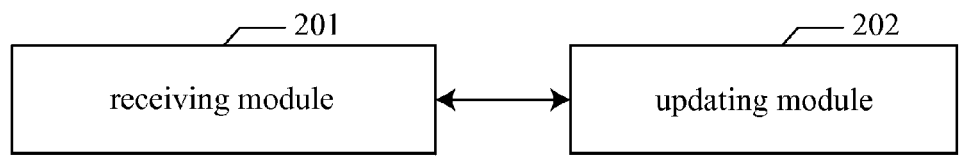
FIG. 8 is a schematic diagram of an apparatus for managing message provided in an embodiment 2 of the present invention.

FIG. 8 is a schematic diagram of an apparatus for managing message provided in embodiment 2 of the present invention. The apparatus may be a server computer that includes one or more processor and one or more memory storing the instructions executable by the one or more processor. The apparatus in FIG. 8 includes:

a receiving module 201 for receiving a request for deleting a message M1 published by user A, the request carries an index ID1 of the message M1;

an updating module 202 for updating message state corresponding to the index ID1 from normal state to deleted state, the deleted state may be used to prevent user B from extracting, forwarding or communicating with the message M1.

The apparatus shown in FIG. 8 can further include the following modules (not shown in FIG. 8).

A first extracting module is configured to receive a request of the user B for extracting messages published by the user A, to return indexes of messages in normal state to the user B, to receive a request sent by the user B for obtaining messages corresponding to indexes in normal state, to search for messages in normal state from the messages published by the user A according to the indexes in normal state, and to return the found messages to the user B.

A second extracting module is configured to, before the receiving module 201 receives a request for deleting the message M1 published by the user A, receive a request of the user B for extracting the message M1 published by the user A, return the message M1 to the user B. After the updating module 202 updates the message state corresponding to the index ID1 from normal state to deleted state in response to the request for deleting the message M1, the second extracting module receives a request sent by the user B for forwarding or communicating with the message M1, and determines the message state corresponding to the index ID1. When the message state corresponding to the index ID1 is deleted state, the updating module 202 notifies the user B of forwarding failure or communicating failure.

In one example, the request sent by the user B for forwarding the message M1 includes comment message published by the user B when the user B forwards the message M1. The second extracting module is further configured to, if the message state corresponding to the index ID1 is normal state, generate a message M2 that includes the forwarded message M1 and the comment message, generate an index ID2 of the message M2, store the index ID2 and an account number of the user B corresponding to the index ID2, and store the index ID2 as well as index ID1 and the comment message corresponding to the index ID2. The second extracting module also finds the corresponding index ID1 and the comment message according to the index ID2, finds the corresponding message M1 according to the index ID1, and returns the found message M1 and the comment message to the user B;

In another example, the request sent by the user B for communicating with the message M1 includes communicating message published the user B when the user B communicates with the message M1. The second extracting module is further configured to, if the message state corresponding to the index ID1 is normal state, take the message M1 and the communicating message as a message M2, generate an index ID2 of the message M2, store the index ID2 and an account number of the user B corresponding to the index ID2, and store the index ID2 as well as index ID1 and the communicating message corresponding to the index ID2. The second extracting module also finds the corresponding index ID1 and the communicating message according to the index ID2, finds corresponding message M1 according to the index ID1, and returns the found message M1 and the communicating message to the user B.

A third extracting module is configured to receive a request of the user C for obtaining an index of the message M2, and to return the index ID2 of the message M2 to the user C.

The third extracting module receives a request of the user C for extracting the message corresponding to the index ID2. If a message type corresponding to the index ID2 is forwarding type, the third extracting module finds the corresponding index ID1, the comment message and the signature of the index ID1 according to the index ID2, and returns the found out index ID1, the comment message and a signature of the index ID1 to the user C. If a message type corresponding to the index ID2 is communicating type, the third extracting module finds corresponding index ID1 and the communicating message according to the index ID2, and returns the found index ID1 and the communicating message to the user C;

The third extracting module receives a request of the user C for extracting the message corresponding to the index ID1. If the message returned to the user C contains a signature of the index ID1, the request also carries the signature of the index ID1.

The third extracting module determines whether to return the message M1 corresponding to the index ID1 to the user C according to the message state corresponding to the index ID1. The third extracting module also determines whether the request carries the signature of the index ID1. If the message state is user deleted state and the request carries the signature of the index ID1, then the third extracting module returns the message M1 corresponding to the index ID1 to the user C; if the message state is user deleted state and the request does not carry the signature of the index ID1, then the third extracting module notifies the user C of extracting failure; if the message state is administrator deleted state, then notifies the user C of extracting failure.

The apparatus provided in the embodiment can specifically be server, and can also be service end that includes various servers or server groups; the apparatus provided in the embodiment and the method embodiment belong to the same concept, and the specific realization process of the apparatus refers to the method embodiment, and will not be repeated here.

In the apparatus provided in the embodiment, through setting the message state, the effect of deleting message can be achieved for clients so that other users cannot extract, forward or communicate with the message in deleted state, but the message still exists, the deleted message can be displayed in certain situations, for example, displaying the original text that has been deleted in a forwarding message that forwards the original text. Embodiments of the present invention have good scalability.

All or some contents of the technical solutions provided in the above embodiments may be implemented through software programming. Corresponding software programs may be stored in non-transitory computer readable storage medium, such as hard disk, compact disk or floppy disk of a computer.

The foregoing are only preferred embodiments of the present invention, and are not used to limit the present invention. Any modification, equivalent replacement, or improvement made without departing from the spirit and principle of the present invention should fall within the scope of the present invention.

The invention claimed is:

1. A method for managing a message, implemented by a processor, the method comprising:

receiving a request for deleting a message M1 published by a user A, wherein the request carries an index ID1 of the message M1;

updating a message state corresponding to the index ID1 from normal state to deleted state, wherein the deleted state is to prevent a user B from extracting, forwarding or communicating with the message M1;

wherein before receiving the request for deleting the message M1 published by the user A, the method further comprises extracting, by the user B, the message M1 published by the user A;

after the updating a message state corresponding to the index ID1 from a normal state to a deleted state, the method further comprises:

receiving a request sent by the user B for forwarding or communicating with the message M1; and judging the message state corresponding to the index ID1, when the message state corresponding to the index ID1 is the deleted state, notifying the user B of forwarding fail or communicating fail;

wherein the request sent by the user B for forwarding the message M1 comprises a comment message published by the user B when the user B forwards the message M1; if the message state corresponding to the index ID1 is the normal state, the method further comprises; taking the message M1 and the comment message as a message M2 of the user B, generating an index ID2 of the message M2, storing the index ID2 and an account number of the user B corresponding to the index ID2, and storing the index ID2 as well as the index ID1 and the comment message corresponding to the index ID2; finding out the corresponding index ID1 and the comment message according to the index ID2, finding out the corresponding message M1 according to the index ID1, and displaying the found message M1 and comment message to the user B;

or, wherein the request sent by the user B for communicating with the message M1 comprises a communicating message published by the user B when the user B communicates with the message M1; if the message state corresponding to the index ID1 is the normal state, the method further comprises; taking the message M1 and the communicating message as a message M2 of the user B, generating an index ID2 of the message M2, storing the index ID2 and a account number of the user B corresponding to the index ID2, and storing the index ID2 as well as the index ID1 and the communicating message corresponding to the index ID2; finding out the corresponding index ID1 and the communicating message according to the index ID2, finding out the corresponding message M1 according to the index ID1, and displaying the found message M1 and the found communicating message to the user B;

wherein the method further comprises;

receiving a request of a user C for obtaining the index of the message M2 of the user B, and displaying the index ID2 of the message M2 to the user C;

receiving a request of the user C for extracting the message corresponding to the index ID2, if a message type corresponding to the index ID2 is a forwarding type, finding out the corresponding index ID1, the comment message and a signature of the index ID1 according to the index ID2, and returning the found index ID1, the comment message and the signature of the index ID1 to the user C; if a message type corresponding to the index ID2 is a communicating type, finding out the corresponding index ID1 and the communicating message according to the index ID2, and displaying the found index ID1 and the communicating message to the user C;

receiving a request of the user C for extracting the message corresponding to the index ID1, if the message returned to the user C comprises the signature of the index ID1, the request further carries the signature of the index ID1; and judging whether to return the message M1 corresponding to the index ID1 to the user C according to the message state corresponding to the index ID1 and whether the request carries the signature of the index ID1; if the message state is a user deleted state and the request carries the signature of the index ID1, then returning the message M1 corresponding to the index ID1 to the user C; if the message state is the user deleted state and the request does not carry the signature of the index ID1, then notifying the user C of extracting fail; if the message state is an administer deleted state, then notifying the user C of extracting fail.

2. The method according to claim 1, wherein the method further comprises:

receiving a request of the user B for extracting messages published by the user A;

displaying indexes in the normal state of messages published by the user A to the user B;

receiving a request sent by the user B for obtaining messages corresponding to the indexes in the normal state, and finding out messages in the normal state from the messages published by the user A according to the indexes in the normal state, and displaying the found messages in the normal state to the user B.

3. A device for managing message comprising: a processor coupled to a memory storing instructions, for executing by the processor, the processor configured to, receive a request for deleting a message M1 published by a user A, wherein the request carries an index ID1 of the message M1;

update a message state corresponding to the index ID1 from normal state to deleted state, wherein the deleted state is to prevent a user B from extracting, forwarding or communicating with the message M1;

wherein the processor is further configured to, before the receiving module receives the request for deleting the message M1 published by the user A, receive a request of the user B for extracting the message M1 published by the user A, return the message M1 to the user B; after updating the message state corresponding to the index ID1 from the normal state to the deleted state, receive a request sent by the user B for forwarding or communicating with the message M1, and judge the message state corresponding to the index ID1, when the message state corresponding to the index ID1 is the deleted state, notify the user B of forwarding fail or communicating fail;

wherein the request sent by the user B for forwarding the message M1 comprises a comment message published by the user B when the user B forwards the message M1; the processor is further configured to, if the message state corresponding to the index ID1 is the normal state, take the forwarded message M1 and the comment message as a message M2 of the user B, generate an index ID2 of the message M2, store the index ID2 and an account number of the user B corresponding to the index ID2, and store the index ID2 as well as the index ID1 and the comment message corresponding to the index ID2; find out the corresponding index ID1 and the comment message according to the index ID2, find out the corresponding message M1 according to the index ID1, and return the found message M1 and the comment message to the user B;

or, the request sent by the user B for communicating with the message M1 comprises a communicating message published by the user B when the user B communicates with the message M1; the processor is further configured to, if the message state corresponding to the index ID1 is the normal state, take the message M1 and the communicating message as a message M2 of the user B, generate an index ID2 of the message M2, store the index ID2 and an account number of the user B corresponding to the index ID2, and store the index ID2 as well as the index ID1 and the communicating message corresponding to the index ID2; find out the corresponding index ID1 and the communicating message according to the index ID2, find out the corresponding message M1 according to the index ID1, and return the found message M1 and the communicating message to the user B;

wherein the processor is further configured to, receive a request of the user C for obtaining an index of the message M2 of the user B, and return the index ID2 of the message M2 to the user C;

receive a request of the user C for extracting the message corresponding to the index ID2, if a message type corresponding to the index ID2 is a forwarding type, find out the corresponding index ID1, the comment message and a signature of the index ID1 according to the index ID2, and return the found index ID1, the comment message and the signature of the index ID1 to the user C; if a message type corresponding to the index ID2 is a communicating type, find out the corresponding index ID1 and the communicating message according to the index ID2, and return the found index ID1 and the communicating message to the user C;

receive a request of the user C for extracting the message corresponding to the index ID1, if the message returned to the user C comprises the signature of the index ID1, the request further carries the signature of the index ID1; and judge whether to return the message M1 corresponding to the index ID1 to the user C according to the message state corresponding to the index ID1 and whether the request carries the signature of the index ID1; if the message state is a user deleted state and the request carries the signature of the index ID1, then return the message M1 corresponding to the index ID1 to the user C; if the message state is the user deleted state and the request does not carry the signature of the index ID1, then notify the user C of extracting fail; if the message state is an administer deleted state, then notify the user C of extracting fail.

4. The device according to claim 3, wherein the processor is further configured to:

receive a request of the user B for extracting messages published by the user A, return indexes in the normal state of messages published by the user A to the user B; receive a request sent by the user B for obtaining messages corresponding to the indexes in the normal state and find out messages in the normal state from the messages published by the user A according to the indexes in the normal state, and return the found messages in the normal state to the user B.

* * * * *